Nov. 14, 1961     E. S. WOODHALL     3,008,180
APPARATUS FOR AUTOMATICALLY POST-CURE INFLATING NYLON TIRES
Filed May 29, 1958     5 Sheets-Sheet 1

INVENTOR.
EDWIN S. WOODHALL
BY
R. L. Miller
ATTORNEY

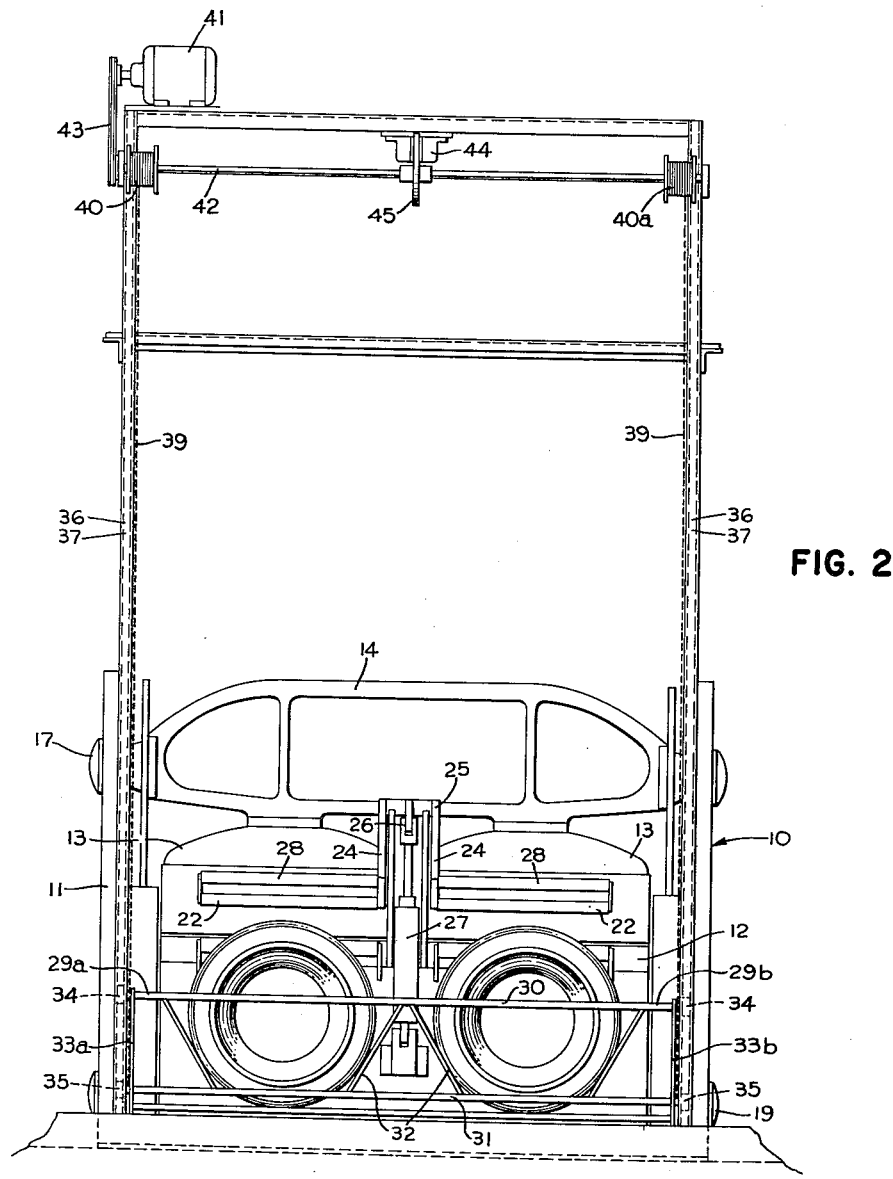

Nov. 14, 1961     E. S. WOODHALL     3,008,180
APPARATUS FOR AUTOMATICALLY POST-CURE INFLATING NYLON TIRES
Filed May 29, 1958     5 Sheets-Sheet 3

INVENTOR.
EDWIN S. WOODHALL
BY
*K. L. Miller*
ATTORNEY

Nov. 14, 1961 E. S. WOODHALL 3,008,180
APPARATUS FOR AUTOMATICALLY POST-CURE INFLATING NYLON TIRES
Filed May 29, 1958 5 Sheets-Sheet 5

INVENTOR.
EDWIN S. WOODHALL
BY
*R. L. Miller*
ATTORNEY

United States Patent Office 3,008,180
Patented Nov. 14, 1961

3,008,180
APPARATUS FOR AUTOMATICALLY POST-CURE INFLATING NYLON TIRES
Edwin S. Woodhall, Gadsden, Ala., assignor to The Goodyear Tire & Rubber Company, Akron, Ohio, a corporation of Ohio
Filed May 29, 1958, Ser. No. 738,826
11 Claims. (Cl. 18—2)

This invention relates to an apparatus for inflating nylon tires automatically and immediately subsequent to cure thereof. Particularly, the invention relates to an apparatus which is automatically synchronized with the operation of an automatic curing press so that tires ejected from the press subsequent to cure are immediately inflated, subsequently cooled while inflated and then conveyed to a location vertically above and to the rear of the press.

An object of the invention is to provide a post-cure inflating apparatus for nylon tires which may be used with currently installed automatic presses without any change in the location of the presses and which is automatically synchronized with the operation thereof to automatically inflate nylon tires immediately subsequent to cure, to cool the tires while inflated and convey the tires to a location vertically above and to the rear of the press.

Other objects and advantages of the invention will become apparent as the description of the apparatus and mode of operation thereof are described with reference to the accompanying drawings in which:

FIG. 2 is a front elevational view of the apparatus shown in FIG. 1;

Figures 1, 3:
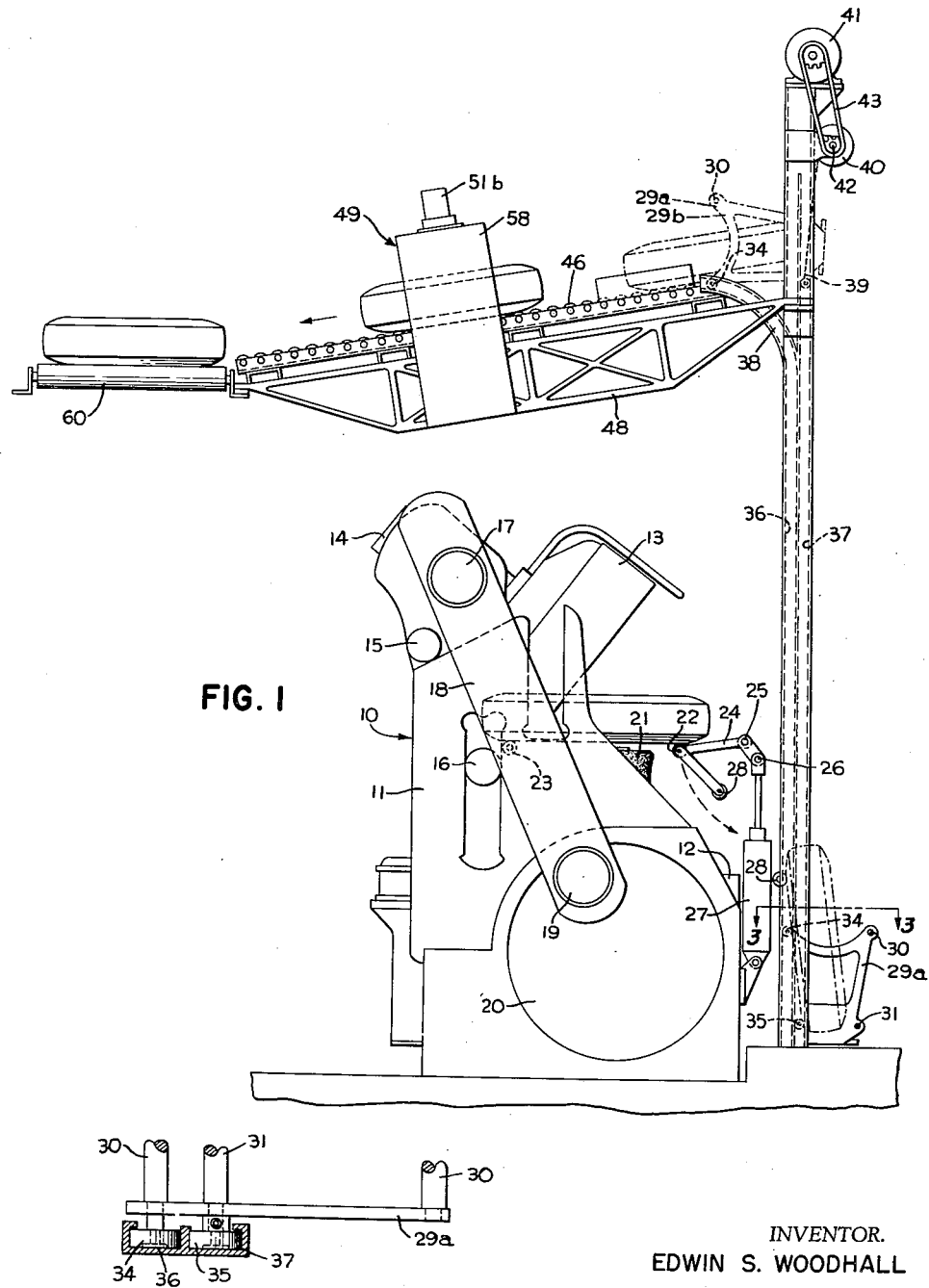
FIG. 1 is a vertical side elevation of the preferred apparatus of this invention.
FIG. 3 is a cross sectional view taken along the lines 3—3 of FIG. 1.

The tire curing press 10 may be any conventional automatic press for shaping and vulcanizing pneumatic tires which are made in the unvulcanized flat or pulley band form. Prior United States Patents 2,808,618 and 2,495,664 are typical examples of such presses. In general such presses comprise a frame 11 supporting dual lower fixed molds 12 and dual upper or movable molds 13 which are supported on a cross beam 14. The beam 14 in turn is pivotably supported on one or more stub axles 15, 16 and 17. The axles 15 and 16 ride upon cam surfaces machined into the frame 11 and the axle 17 is pivotally supported within the link 18 which is driven by pin 19 eccentrically positioned on the large gear wheel 20. With the press fully opened as shown in FIG. 1, the operator places the uncured tire band over the diaphragm 21 and presses a push button which initiates movement of the bull gear 20 and in turn initiates movement of the upper mold 13 in its downward travel. As the mold 13 is moved downwardly the diaphragm 21 is inflated and the tire band is compressed and shaped into toroidal form. When the mold is fully closed high pressure steam is admitted to and maintained within the diaphragm 21 for a sufficient period to cure the tire. Thereafter, the steam is vented and after a suitable interval to permit the pressure to reach a safe limit, the upper mold is raised.

After the upper mold 13 has moved away from the lower mold 12 the diaphragm 21 is raised to strip the cured tire from the lower mold 12 and the diaphragm 21 is then elongated by moving the ends thereof axially so that the diaphragm is stripped out of the tire. In this position a set of bars or rollers 22 and 23 are pivoted from inoperative positions respectively at the front of and rear of the mold into a plane below the tire so that when the diaphragm 21 is lowered the tire rests upon the ejector bars 22 and 23 as shown in FIG. 1 of the drawings.

The bar 22 is supported upon the link 24 pivoted to a supporting member 25 and actuated by a link 26 driven by a piston 27. The member 25 is disposed between the dual molds 12 and the bar 22 extends transversely of the member 25 and each mold 12. The idle position of the bar 22 is shown in dotted lines in FIG. 1. The bar 23 is supported and actuated in a similar manner as the bar 22 but at the rear of the molds 12.

In accordance with this invention, the tire is ejected from the position shown in FIG. 1 of the drawings towards the front of the press 10 by raising the ejector bar 23 and lowering the bar 22 so that the tire is tipped or pivoted over the bar 22 and falls by gravity over the rollers 28 into a vertical plane at the front of the plane.

Figure 4:
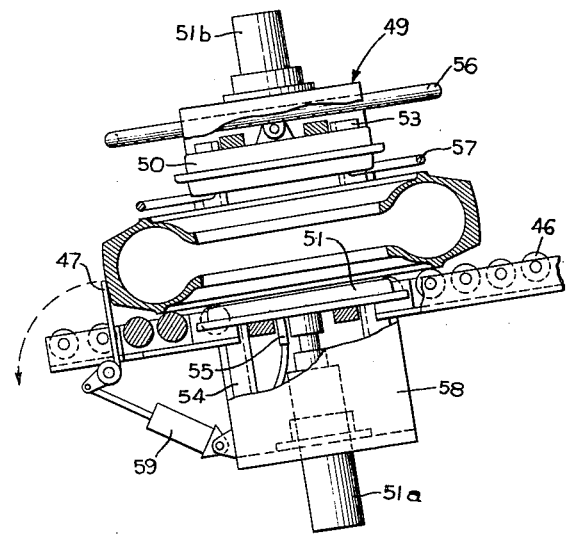
FIG. 4 is an enlarged elevational view with parts in cross section of the inflating stand in idle position.

Referring to FIG. 2 of the drawings, a pair of buckets or containers 29a and 29b are normally positioned at the front of the press and below the plane of the molds 12 so as to receive the tires as they fall over the rollers 28. The containers 29a and 29b are constructed of pairs of upper and lower tubular cross members 30 and 31 and diagonally positioned tubular members 32 interconnecting the pairs of horizontal members 30 and 31. The ends of the horizontal members 30 and 31 are secured to end members 33a and 33b. The vertical edge of each end member 33a and 33b nearest the press 10 is provided with an upper roller 34 and a lower roller 35 each positioned for travel in a respective track 36 and 37. The track members 36 and 37 extend vertically in a vertical plane from a position in front of the press to a position vertically above the press 10. At its upper reach, the track 36 is curved as at 38 in a direction toward the press 10. The containers 29a and 29b are vertically raised within the track members 37 and 36 by means of a cable 39 fastened to each of the end members 33a and 33b and to a respective wind-up drum 40 and 40a which are driven by a motor 41 driving the shaft 42 through belt 43. A friction brake 44 engages a disc 45 secured to shaft 42 to hold the containers in the upper position and permit controlled gravity descent thereof. It is seen that as the containers 29a and 29b are raised, the upper rollers 34 will follow the curved portion 38 of track 36 while the lower roller 35 will follow the track 37 which remains in a vertical plane. Thus, the upper portion of the containers 29a and 29b will be tilted about the axis of the roller 35 as the roller 34 follows the curved portion 38 of track 37. The tires are thereby positioned in the plane of the inclined roller dual conveyor 46 and will slide out of the containers 29a and 29b onto and along the conveyor 46 until they contact the stop 47 shown in FIG. 4 of the drawings. The roller conveyor 46 is supported upon a bridge structure 48 extending from the plane of the curved portion 38 of tracks 36 to a position at the rear of the press 10 and in a plane vertically above the press 10.

Figure 5:
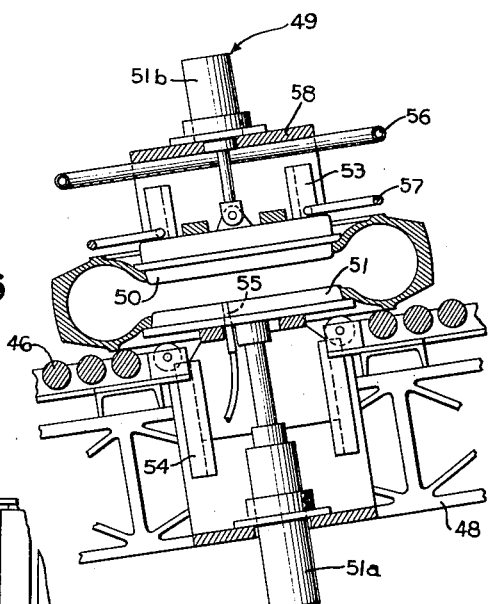
FIG. 5 is a cross sectional view through the inflation stand in operative position.
Figure 6:
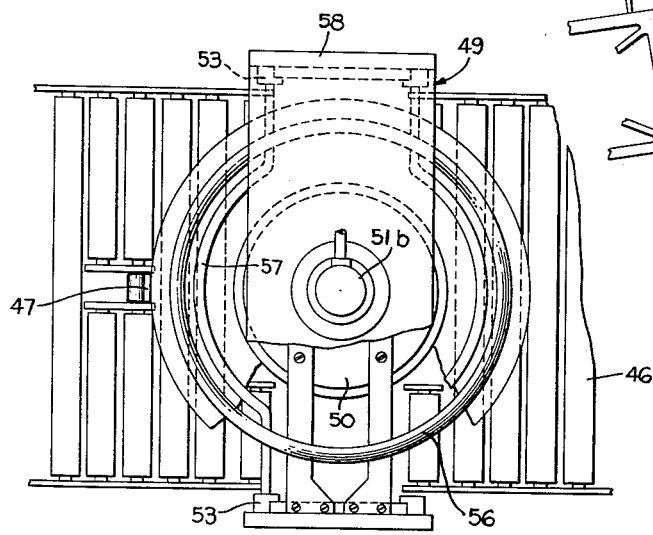
FIG. 6 is a plan view with parts broken away of the inflation stand.

A tire inflating mechanism, generally referred to by numeral 49, is supported upon the bridge member 48. As shown in FIG. 5 of the drawings, the inflating mechanism 49 is provided with a pair of rim discs 50 and 51 each of which are reciprocated respectively by cylinders 51a and 51b within the tracks 53 and 54 from the position shown in FIG. 4 to the position shown in FIG. 5. When the tire has contacted the stop member 47 a suitable limit switch (not shown) is actuated so as to cause pneumatic or hydraulic pressure to be admitted to the cylinders 51a and 51b thereby moving discs 50 and 51 against the beads of the tire. Inflationary air is then admitted into the chamber formed by the discs and tire through the hole 55. After the tires have been inflated to a pressure of approximately 50 p.s.i., a cooling fluid, preferably water, is sprayed from the sprinkling head 56.

The tire remains in an inflated condition and is artificially cooled by the water spray emitted from head 56 until the temperature of the tire has been reduced to a temperature substantially below the heat shrinking temperature of nylon cord. The cooling period is less than the curing cycle of the press and generally about 15 minutes. Thereafter, the discs 50 and 51 are moved away from each other. The bead of the tire is removed from the disc 51 by the roller conveyor 46 and the disc 50 is removed from the bead of the tire by means of the annular rod 57 which is secured to the fixed frame 58 supporting the cylinder 51b and tracks 53 and 54. At this time the solenoid actuated lock 59 is retracted so that the stop member 47 is free to pivot to a position below the plane of the conveyor 46 and the tire slides by gravity along the conveyor 46 to the take-away conveyor 60 which is located to the rear of and vertically above the press 10.

Figure 7:
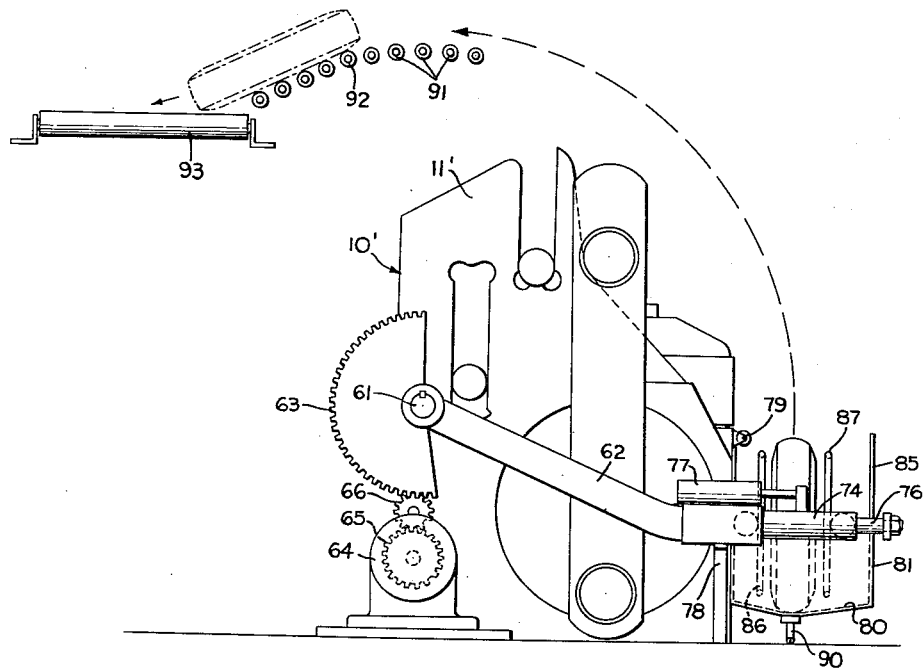
FIG. 7 is a side elevational view of another modification of the present invention.
Figure 8:
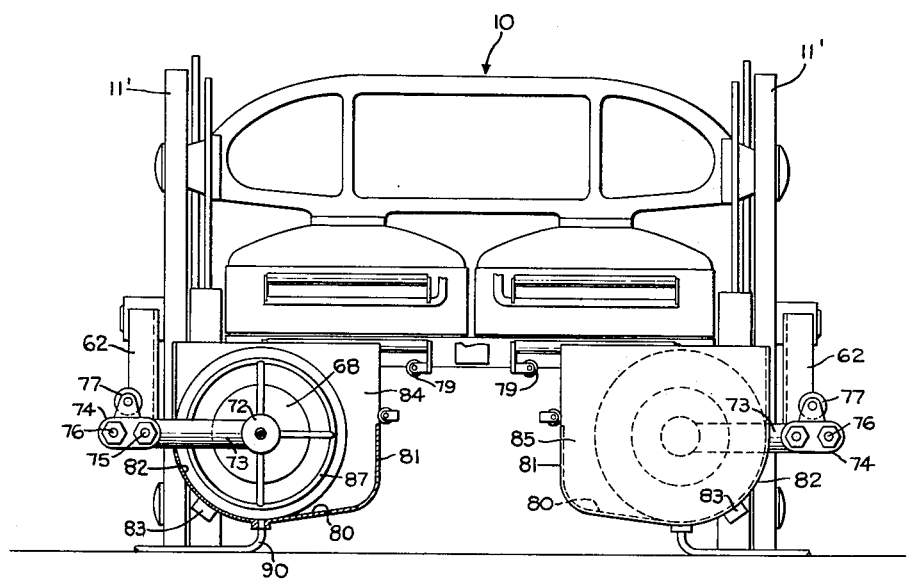
FIG. 8 is a front elevational view of the apparatus shown in FIG. 7.
Figure 9:
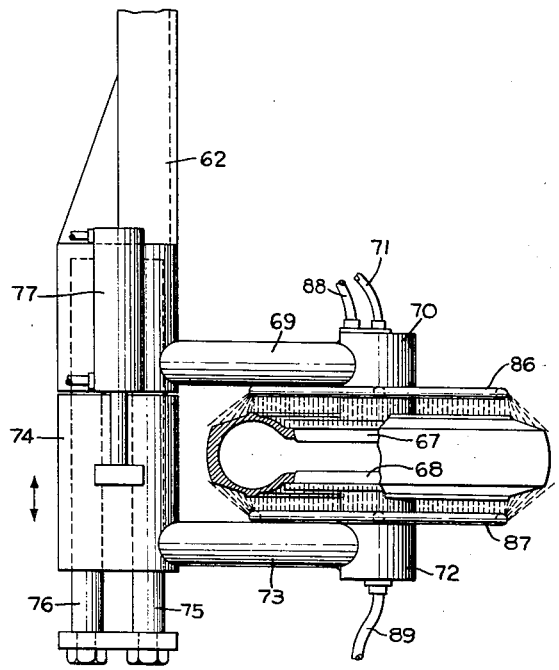
FIG. 9 is an enlarged partial plan view of the apparatus shown in FIG. 7.

Referring to FIGS. 7 through 9 of the drawings, another modification of the present invention is shown. The press 10' is constructed and operates in a manner similar to the press 10 shown in FIG. 1. A trunnion 61 is provided on the frame 11' about which the arm 62 rotates in a vertical plane outboard of the frame members 11'. The arm 62 is provided with a segmental bull gear 63 driven by a motor 64 through a set of gears 65 and 66. In idle position the arm 62 extends in a direction toward the front of the press 10' and the outer end of the arm 62 supports a pair of tire inflating discs 67 and 68. The disc 67 is fastened to a stub arm 69 by means of a stub axle 70 having an air line 71 extending therethrough. The arm 69 in turn is secured directly to the arm 62. The discs 68 is movable relative to the disc 67 and is supported about a stub axle 72 fastened to an arm 73 which is secured to a carriage member 74. The carriage 74 is suitably bored to receive a pair of rods 75 and 76 which are fixed to the member 62. The carriage 74 thereby reciprocates along the rods 75 and 76 and is actuated by means of a pneumatic or hydraulic cylinder 77.

In normal position the arm 62 lies horizontally as shown in FIG. 7. A stop 78 engages arm 62 to accurately position the arm so that the discs 67 and 68 lie in a vertical plane with the arm in the position shown in FIG. 7. The tire is ejected from the press 10' in the same manner as from the press 10 and falls over the stationary rollers 79 into a vertical plane as shown in the dotted lines in FIG. 8. The tire then rolls down the bottom surface 80 of the trough 81 which declines toward the ends of the press 10'. The bottom surface 80 of the trough 81 has a curved portion 82 which halts the travel of the tire and substantially aligns the bead area of the tire with the discs 67 and 68. A suitable limit switch 83 is contacted by the tire when in the position shown in FIG. 8 which switch provides a signal for controlling actuation of the cylinder 77 to move the disc 68 toward the disc 67 to thereby mount the tire upon the discs 67 and 68. Inflationary air at about 50 p.s.i. is then injected into the tire through the line 71.

The sidewalls 84 and 85 of the trough 81 provide a shield which at least partially encloses the inflated tire and forms an enclosure for water spray emitted from the spraying rings 86 and 87 which are suitably fixed to the disc 67 and 68. The spraying rings 86 and 87 are of annular shape and are fed with coolant through the lines 88 and 89. A suitable drain 90 is provided at the lowest portion of the trough 81.

After inflation of the tire on the disc 67 and 68 it is retained in the position shown in FIG. 8 for a sufficient period, approximately 15 minutes, to cool the tire below the heat shrinking temperature of nylon. Thereafter, the motor 64 is energized to rotate the arm 62 about the trunnion 61 to thereby carry the tire from the position shown in FIG. 7 to a position vertically above the press 60, as shown in dotted lines in FIG. 7. The cylinder 77 is then actuated to retract the disc 68. During the terminal portion of the travel of the arm 62, the tire is engaged by rollers 91 of the roller conveyor 92 to thereby lift the tire off of the disc 68 and permit the tire to fall by gravity along the roller conveyor 92 and hence onto the taking away conveyor 93 which is located vertically above and to the rear of the press 10'.

It is thus seen that in the apparatus of this invention the cured tire is ejected from the press and conveyed from a position in front of the press to a position in the plane vertically above the press and to the rear thereof. The tire is also post cure inflated in a minimum period of time, approximately 10 to 45 seconds, subsequent to ejection from the press, and cooled while inflated until the temperature of the tire has been reduced below the heat shrinking temperature of nylon.

Although the invention has been described and illustrated so that the containers 29a and 29b and the arm 62 are normally positioned at the front of the press 10 and 10' respectively, it is obvious that for certain press installations it may be desirable that the containers 29a and 29b be normally positioned at the top of the track members 38 and 37 in FIG. 1 and lowered immediately prior to ejection of the tire from the mold. Likewise, it may be desirable that the arm 62 in FIG. 7 be normally in a position such that the rim discs 67 and 68 are positioned vertically above the press 10', the arm 62 being lowered as shown in FIG. 7 immediately prior to ejection of the tire from the press. In this event the arm 62 would be raised to convey the inflated tire to a spraying chamber located vertically above the press.

Those skilled in the art may readily provide suitable controls for effecting operation of the conveyor means, rim discs and spraying head shown in the various modifications of this invention. Therefore, no such control elements or circuitry have been herein illustrated. Switches and timers may be provided where necessary to control the drive motors 41 and 64 and to energize the solenoid and limit switches in the manner described and to admit or vent air under pressure from within the tire and the actuating cylinders 51a and 51b, 27 and 77. These controls are within the realm of selection of the skilled mechanic and no invention is seen in showing any of the various forms thereof which may be employed to accomplish the desired actuation of the various elements in the proper sequence and in the desired time relation.

While certain representative embodiments and details have been shown for the purpose of illustrating the invention, it will be apparent to those skilled in this art that various changes and modifications may be made therein without departing from the spirit or scope of the invention.

I claim:

1. An apparatus for conveying pneumatic tires from a curing press and simultaneously post-cure inflating said tires comprising a vertically opening automatic tire curing press, means for ejecting the tire from the press after cure, means for moving the tire to the front end of said press and for positioning the tire in a container located at the front of said press and below the mold therein, said tire being positioned in said container in a vertical plane, means for moving the container upwardly of said press, a gravity conveyor extending toward the rear of the press and located vertically above the press, means for tilting said container toward the rear of the press at the upper reach of its course of travel to deposit the tire on said gravity conveyor, means including a pair of bead engaging discs for sealing the beads of the tire while on said gravity conveyor means for inflating the tire, means for artificially cooling the tire while it is inflated, and a second conveying means located above and to the rear of said mold to receive the tire from the discharge end of said gravity conveyor.

2. An apparatus as claimed in claim 1 in which said container is reciprocated within a vertical track, a motor for powering said container, and means for controlling said motor to actuate said container immediately after a tire has been deposited in said container.

3. An apparatus for conveying pneumatic tires from a curing press and simultaneously post-cure inflating said tires comprising in combination a vertically opening automatic tire curing press, means for ejecting the tire from the press after cure, means for moving the tire to the front end of said press and for positioning the tire in a vertical plane, an arm pivoted to the frame of said press operable in a vertical plane substantially normal to the vertical plane of said tire, a pair of rim discs supported by said arm in a plane parallel to the plane of said tire, means for moving at least one of said discs toward the other to engage the bead area of the tire, means to inflate the tire, and means for actuating said arm to move the tire into a substantially horizontal plane vertically above the press, and conveying means on which said tire is deposited when the rim discs are retracted to release the tire, said conveyor means being located vertically above the press and to the rear thereof.

4. An apparatus as claimed in claim 3 in which said tire is artificially cooled by a water spraying system after being inflated on said rim disc.

5. An apparatus as claimed in claim 4 in which said water spraying system includes a pair of annular spraying rings supported on said rim disc, and means for supplying water to said rings immediately after inflation of the tire and while the tire is positioned at the front end of said press.

6. An apparatus as claimed in claim 5 in which said tire and spraying rings are at least partially enclosed by a shield for retaining said water spray.

7. An apparatus for conveying pneumatic tires from a curing press and simultaneously post-cure inflating tires comprising in combination a vertical opening automatic curing press, means for ejecting the tire from the press after cure, means for moving the tire to the front end of said press and for positioning the tire in a vertical plane, a horizontal conveyor located above and to the rear of said press, a conveying arm pivoted to the frame of said press for conveying the tire upwardly and rearwardly of said press onto said horizontal conveyor, means secured to said arm for sealing the beads and for inflating the tire while on said conveying arm but before reaching said horizontal conveyor, and means for artificially cooling the tire after inflation of the tire.

8. An apparatus for conveying pneumatic tires from a curing press and simultaneously post-cure inflating said tires comprising in combination a vertical opening automatic tire curing press; means for ejecting the tire from the press after cure; means for moving the tire to the front end of said press and for positioning the tire in a vertical plane; means supported at the front of said press for conveying the tire upwardly and rearwardly of said press including a first conveyor for moving said tire from said vertical plane in front of said press to a horizontal position vertically above said press; means for inflating the tire while on said conveyor means comprising a pair of bead engaging discs supported on said conveyor means in a plane normal to the axis of said tire, means for moving at least one of said bead engaging discs toward the other to engage the bead area of the tire, and means to inflate the tire; and a second conveying means on which said tire is deposited when the bead engaging discs are retracted to release the tire, said second conveyor means being located vertically above the press and to the rear thereof.

9. An apparatus as claimed in claim 8 in which a water-spraying system is located in a plane vertically above said press and adjacent said inflating means for cooling the tire after inflation thereof.

10. An apparatus as claimed in claim 9 in which said means to inflate the tire is positioned in a plane vertically below said spray system.

11. An apparatus as claimed in claim 8 in which said first conveyor means comprises a reciprocating conveyor operable in a vertical plane at the front of said press and a gravity roller conveyor receiving the tire from said reciprocating conveyor for conveying the tire to said horizontal position above said press.

References Cited in the file of this patent
UNITED STATES PATENTS

| | | |
|---|---|---|
| 1,041,020 | Carstens | Oct. 15, 1912 |
| 1,540,219 | Myers | June 2, 1925 |
| 2,693,891 | English | Nov. 9, 1954 |
| 2,695,520 | Karsai | Nov. 30, 1954 |
| 2,832,991 | Soderquist | May 6, 1958 |
| 2,978,741 | Soderquist | Apr. 11, 1961 |

FOREIGN PATENTS

| | | |
|---|---|---|
| 1580/56 | Union of South Africa | Jan. 2, 1957 |